United States Patent
Abbey et al.

(10) Patent No.: US 10,357,120 B2
(45) Date of Patent: Jul. 23, 2019

(54) COLLAPSIBLE BOWL WITH LID CONVERTIBLE TO LEGS

(71) Applicants: Loving Pets Corporation, Cranbury Township, NJ (US); Gravity Product Development, LLC, Golden, CO (US)

(72) Inventors: Eric Abbey, East Brunswick, NJ (US); John James Stone, Golden, CO (US)

(73) Assignees: LOVING PETS CORPORATION, Cranbury Township, NJ (US); GRAVITY PRODUCT DEVELOPMENT, LLC, Golden, CO (US)

( * ) Notice: Subject to any disclaimer, the term of this patent is extended or adjusted under 35 U.S.C. 154(b) by 196 days.

(21) Appl. No.: 15/364,750

(22) Filed: Nov. 30, 2016

(65) Prior Publication Data
US 2018/0148240 A1     May 31, 2018

(51) Int. Cl.
*A01K 5/01* (2006.01)
*A47G 19/02* (2006.01)

(52) U.S. Cl.
CPC ............ *A47G 19/02* (2013.01); *A01K 5/0114* (2013.01)

(58) Field of Classification Search
CPC .... B65D 51/249; B65D 43/22; B65D 43/164; B65D 21/086; B65D 51/24; B65D 21/08; B65D 11/18; B65D 25/28; A47J 47/16; A47J 43/0727; A47G 19/02; A47G 2019/2277; A47G 19/00; Y10S 220/907; Y10S 292/63; Y10S 292/11; Y10S 292/38; Y10T 292/1043; Y10T 292/1075; Y10T 292/1078; Y10T 292/1039; Y10T 292/1041; Y10T 292/1083; Y10T 292/1084; Y10T 292/1085; Y10T 292/1092; E05C 3/00; E05C 3/04; E05C 3/02; E05C 3/041; E05C 3/042; E05C 3/046

USPC ........... 206/574; 220/212, 8, 4.28, 574, 666, 220/756; 70/80, 48, 42, 117, 121, 132; 248/460–465, 150, 155.1, 346.2

See application file for complete search history.

(56) References Cited

U.S. PATENT DOCUMENTS

| | | | | |
|---|---|---|---|---|
| 3,811,718 A | * | 5/1974 | Bates | E05C 3/045 292/241 |
| 4,585,915 A | * | 4/1986 | Moore | B65D 81/3453 219/732 |
| 9,616,563 B2 | * | 4/2017 | Vilkormirski | B25H 3/025 |

* cited by examiner

*Primary Examiner* — Anthony D Stashick
*Assistant Examiner* — James M Van Buskirk
(74) *Attorney, Agent, or Firm* — Standley Law Group LLP

(57) ABSTRACT

The present invention is directed to a portable feeding apparatus or bowl, more particularly to a travel feeding apparatus for pets having a hinged lid that converts to legs for supporting the bowl in an upright manner. The hinged lid has a lock for locking the lid in a closed position.

16 Claims, 4 Drawing Sheets

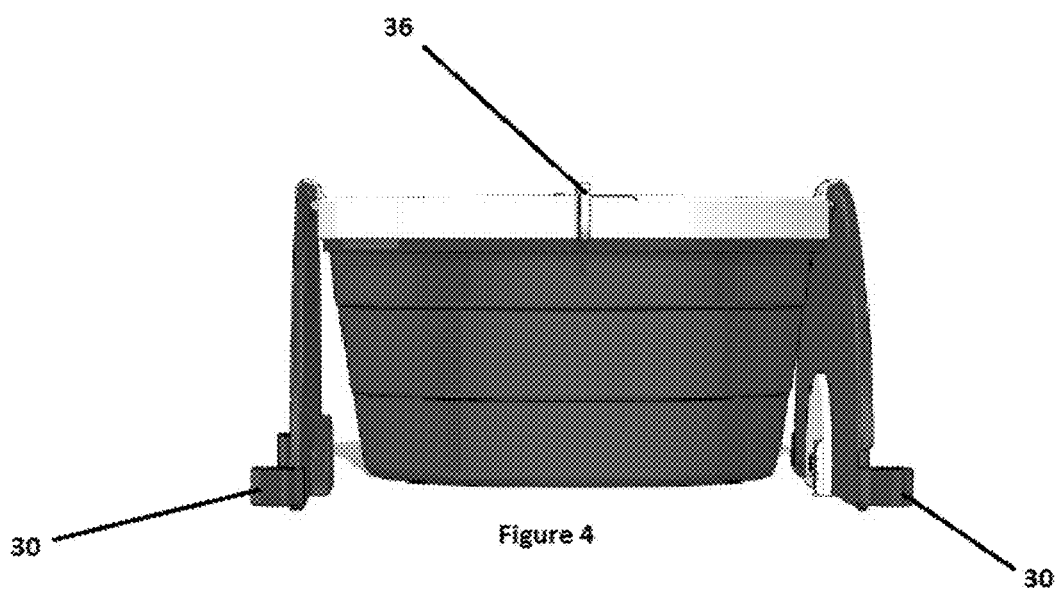

COLLAPSIBLE BOWL WITH LID CONVERTIBLE TO LEGS

BACKGROUND OF THE INVENTIVE FIELD

The present invention is directed to a portable feeding apparatus or bowl, more particularly to a travel feeding apparatus having a collapsible bowl for food and water. Although collapsible feeding bowls are known in the art, the present invention is novel in that it provides a unique combination of features that provides a portable bowl feeding/drinking apparatus while also allowing for the storage and transport of food and/or water or other liquids. The bowl also has a lid that converts into legs for supporting the bowl in an upright position. The present invention provides for a highly flexible, compactable and convenient apparatus for storing food/liquid, carrying food/liquid, and feeding not previously known in the art.

SUMMARY OF THE GENERAL INVENTIVE CONCEPT

The present invention relates to a portable, traveling feeding apparatus, preferably comprised of a collapsible bowl having an opening and a rim; a lid comprised of a first lid portion and a second lid portion, wherein the first and second lid portions are in a semi-circle shape and wherein the first and second lid portions each have a straight edge; a first hinge for hingably connecting the first lid portion to the bowl; a second hinge for hingably connecting the second lid portion to the bowl; a lock for fastening the first and second lid portions together in a closed position; wherein the first and second lid portions are adapted to act as support stands for the bowl when in the open position; and wherein the collapsible bowl is adapted to be expanded to hold food or water and collapsed to conserve space.

BRIEF DESCRIPTION OF THE DRAWINGS

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

In addition to the features mentioned above, other aspects of the present invention will be readily apparent from the following descriptions of the drawings and exemplary embodiments, wherein like reference numerals across the several views refer to identical or equivalent features, and wherein:

FIG. 4 illustrates the portable feeding bowl of FIG. 1 showing the lid in an open position with the first and second lid portions acting as support stands for the bowl.

DETAILED DESCRIPTION OF EXEMPLARY EMBODIMENT(S)

Figure 1:
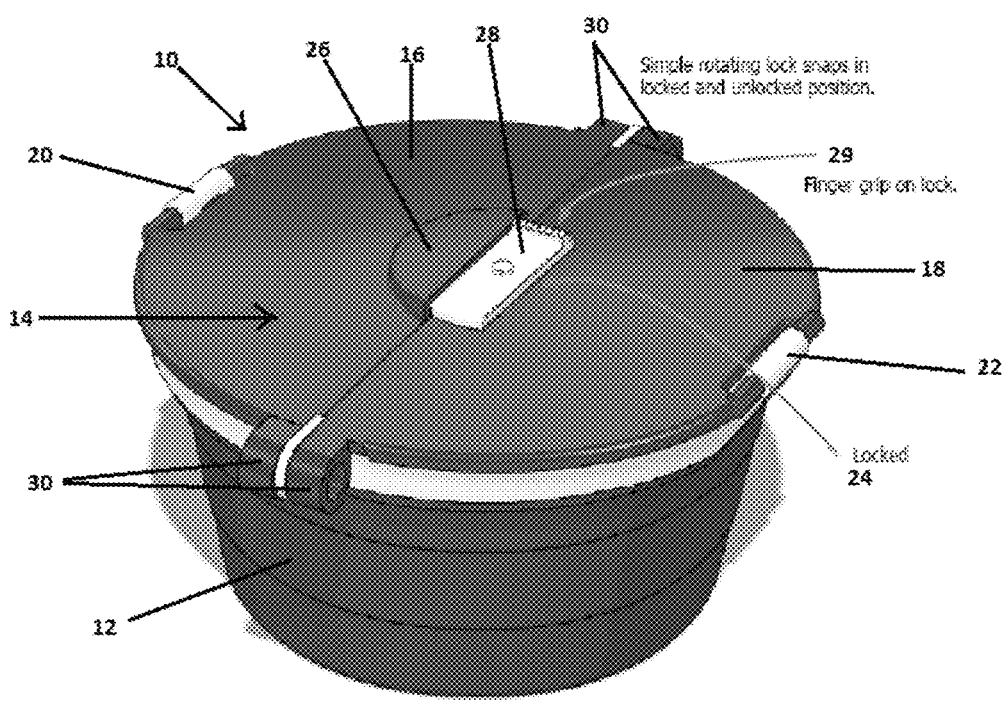
FIG. 1 illustrates one embodiment of the portable feeding bowl of the present invention showing the lock in a locked position.

The present invention relates to a portable, traveling feeding apparatus 10, preferably comprised of a first collapsible bowl 12. FIG. 1 illustrates one embodiment of the portable feeding bowl of the present invention showing the lock in a locked position. The bowl is collapsible into a flat position for easy storage and transport. Collapsible bowls are known in the art. The lid 14 is comprised of a first portion 16 in a semi-circle shape and a second portion 18 also in a semi-circle shape. The first and second lid portions are connected to the rim of the bowl by hinges 20, 22, respectively. The hinges allow the first and second lid portions to open and close, off and on, the opening of the bowl.

In the embodiment of FIG. 1, the lid is comprised of a lock 24 that rotates to lock and unlock the lid. The first portion of the lid has a raised portion 26 in a semi-circle shape for accepting the locking mechanism 28. The locking mechanism has a first end in a semi-circle shape that fits within an opening formed by the raised portion of the lid that locks in place to secure the lid portions together in a locked fashion. The locking mechanism has an opposite end that is straight. When the locking mechanism is rotated around a center fastener or screw, the lock is unlocked allowing the lid portions to open. For example, in the embodiment shown in FIG. 1, when the locking mechanism is rotated in the clockwise direction, the semi-circle end rotates out of the raised portion of the lid and the straight end of the locking mechanism rotates so that the straight end is parallel to the straight edge of the raised portion of the lid (but does not go into the raised portion of the lid). When the locking mechanism is completely out of the raised portion of the lid, the lock is unlocked and the lid portions can be opened for access to the bowl.

Figure 2:
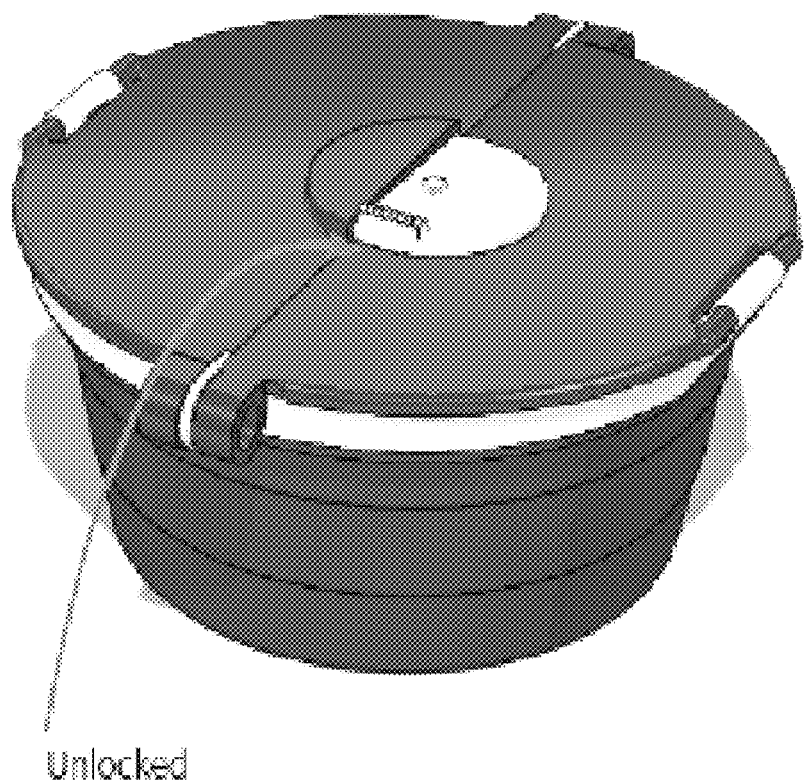
FIG. 2 illustrates the portable feeding bowl of FIG. 1 showing the lock in an unlocked position.

FIG. 2 illustrates the portable feeding bowl of FIG. 1 showing the lock in an unlocked position. The locking mechanism can be rotated in the counter-clockwise direction to relock the bowl. In the embodiment of FIG. 1, the locking mechanism is adapted with a finger grip 29 on one edge to facilitate gripping of the lock with the tip of a finger.

Figure 3:
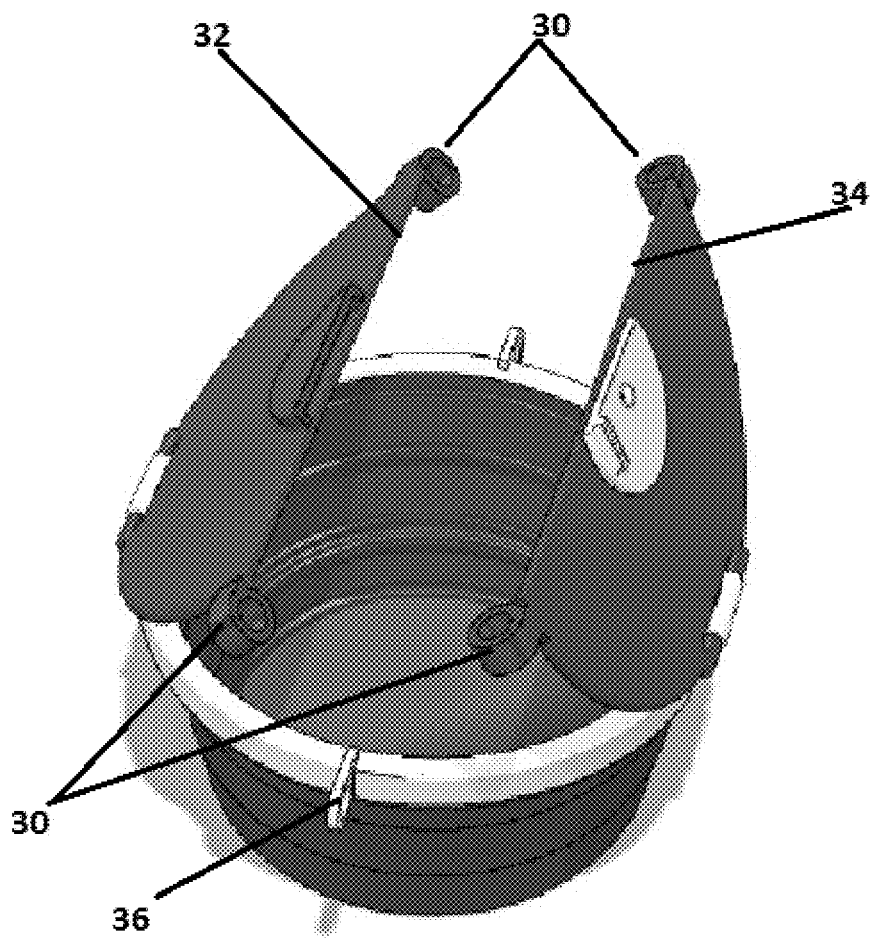
FIG. 3 illustrates the portable feeding bowl of FIG. 1 showing the lid in a semi-open position.

The first and second portions of the lid can be opened to so that the first and second lid portions act as support stands for the bowl. FIG. 3 illustrates the portable feeding bowl of FIG. 1 showing the lid in a semi-open position. FIG. 4 illustrates the portable feeding bowl of FIG. 1 showing the lid in an open position with the first and second lid portions acting as support stands for the bowl. The first lid portion has two stand portions 30 attached to opposite ends of the straight edge 32 of the first lid portion that act as a support base or feet when the lid portions are in the open position. The second lid portion also has two stand portions 30 attached at the opposite ends of the straight edge 34 of the second lip portion that similarly act as a support base or feet. When in the open position, the first and second lid portions act as support stands to prevent the bowl from tipping over during use.

In the embodiment shown in FIGS. 3 and 4, the stand portions are tubular in shape having hollow openings. The stand portions are preferably attached to the lids so that they hang over the rim of the bowl opening when the lid portions are in the closed position. They are also adapted so the tubular openings of the stand portions on the first and second lid portions mate and align with each other when the lid portions are in the closed position. The radius of the lid is preferably the same length, or approximately the same length, as the height of the bowl when in an uncollapsed state. This allows the lid portions to act as support stands for the bowl.

The bowl of the present invention also has a coupling member 36 attached to the bowl having a cut-out hole portion that matches and aligns with the tubular openings in the stand portions. The coupling member is sandwiched between the two stand portions on each side of the lid when the lid portions are in the closed position.

What is claimed is:

1. A portable feeding apparatus, comprising:
   a collapsible bowl having an opening and a rim;
   a lid comprised of a first lid portion and a second lid portion, wherein the first and second lid portions are in a semi-circle shape and wherein the first and second lid portions each have a straight edge;
   a first hinge for hingably connecting the first lid portion to the bowl;
   a second hinge for hingably connecting the second lid portion to the bowl;
   a lock for fastening the first and second lid portions together in a closed position;
   a first stand portion attached at one end of the straight edge of the first lid portion;
   a second stand portion attached at the opposite end of the straight edge of the first lid portion;
   a third stand portion attached at one end of the straight edge of the second lid portion;
   a fourth stand portion attached at the opposite end of the straight edge of the second lid portion;
   and wherein the first and second stand portions act as a support base when the first lid portion is in the open position;
   and wherein the third and fourth stand portions act as a support base when the second lid portion is in the open position;
   wherein the first and second lid portions are adapted to act as support stands for the bowl when in an open position;
   wherein the first, second, third and fourth stand portions are tubular in shape with hollow openings;
   wherein the openings of the stand portions on the first and second lid portions mate and align with each other when the lid portions are in the closed position; and
   wherein the collapsible bowl is adapted to be expanded to hold food or water and collapsed to conserve space.

2. The portable feeding apparatus of claim 1, further comprising:
   a first coupling member interposed between the first and third stand portions when the first and second lid portions are in the closed position;
   a second coupling member interposed between the second and fourth stand portions when the first and second lid portions are in the closed position;
   and wherein the first coupling member has a cut-out opening that mates and aligns with the first and third stand portions when the first and second lid portions are in the closed position;
   and wherein the second coupling member has a cut-out opening that mates and aligns with the second and fourth stand portions when the first and second lid portions are in the closed position.

3. The portable feeding apparatus of claim 1, wherein the first lid portion is further comprised of a raised portion in a semi-circle shape having an opening, and wherein the lock is comprised of:
   a locking mechanism attached to the second lid portion, the locking mechanism in a semi-circle shape that fits within the opening formed by the raised portion, the locking mechanism having an end that is straight edge;
   wherein the locking mechanism is adapted to rotate to lock the first and second lid portions in the closed position.

4. The portable feeding apparatus of claim 3, wherein the locking mechanism is adapted with a finger grip.

5. A portable feeding apparatus, comprising:
   a bowl having an opening and a rim;
   a lid comprised of a first lid portion and a second lid portion, wherein the first and second lid portions are in a semi-circle shape and wherein the first and second lid portions each have a straight edge;
   a first hinge for hingably connecting the first lid portion to the bowl;
   a second hinge for hingably connecting the second lid portion to the bowl;
   a lock for fastening the first and second lid portions together in a closed position;
   a first stand portion attached at one end of the straight edge of the first lid portion;
   a second stand portion attached at the opposite end of the straight edge of the first lid portion;
   a third stand portion attached at one end of the straight edge of the second lid portion;
   a fourth stand portion attached at the opposite end of the straight edge of the second lid portion;
   and wherein the first and second stand portions act as a support base when the first lid portion is in an open position;
   and wherein the third and fourth stand portions act as a support base when the second lid portion is in an open position;
   wherein the first, second, third and fourth stand portions are tubular in shape with hollow openings;
   wherein the openings of the stand portions on the first and second lid portions mate and align with each other when the lid portions are in the closed position; and
   wherein the first and second lid portions are adapted to act as support stands for the bowl when in the open position.

6. The portable feeding apparatus of claim 5, further comprising:
   a first coupling member interposed between the first and third stand portions when the first and second lid portions are in the closed position;
   a second coupling member interposed between the second and fourth stand portions when the first and second lid portions are in the closed position;
   and wherein the first coupling member has a cut-out opening that mates and aligns with the first and third stand portions when the first and second lid portions are in the closed position;
   and wherein the second coupling member has a cut-out opening that mates and aligns with the second and fourth stand portions when the first and second lid portions are in the closed position.

7. The portable feeding apparatus of claim 5, wherein the first lid portion is further comprised of a raised portion in a semi-circle shape having an opening, and wherein the lock is comprised of:
   a locking mechanism attached to the second lid portion, the locking mechanism in a semi-circle shape that fits within the opening formed by the raised portion, the locking mechanism having an end that is straight edge;
   wherein the locking mechanism is adapted to rotate to lock the first and second lid portions in the closed position.

8. The portable feeding apparatus of claim 7, wherein the locking mechanism is adapted with a finger grip.

9. A portable feeding apparatus, comprising:
   a bowl having an opening and a rim;

a lid comprised of a first lid portion and a second lid portion, wherein the first and second lid portions are in a semi-circle shape and wherein the first and second lid portions each have a straight edge;
a first hinge for hingably connecting the first lid portion to the bowl;
a second hinge for hingably connecting the second lid portion to the bowl;
a lock for fastening the first and second lid portions together in a closed position;
wherein the first lid portion is further comprised of a raised portion in a semi-circle shape having an opening, and wherein the lock is comprised of:
a locking mechanism attached to the second lid portion, the locking mechanism in a semi-circle shape that fits within the opening formed by the raised portion, the locking mechanism having an end that is straight edge;
wherein the locking mechanism is adapted to rotate to lock the first and second lid portions in the closed position;
a first stand portion attached at one end of the straight edge of the first lid portion;
a second stand portion attached at the opposite end of the straight edge of the first lid portion;
a third stand portion attached at one end of the straight edge of the second lid portion;
a fourth stand portion attached at the opposite end of the straight edge of the second lid portion;
and wherein the first and second stand portions act as a support base when the first lid portion is in the open position;
and wherein the third and fourth stand portions act as a support base when the second lid portion is in the open position;
wherein the first, second, third and fourth stand portions are tubular in shape with hollow openings;
wherein the openings of the stand portions on the first and second lid portions mate and align with each other when the lid portions are in the closed position; and
wherein the first and second lid portions are adapted to act as support stands for the bowl when in an open position.

10. The portable feeding apparatus of claim 9, further comprising:
a first coupling member interposed between the first and third stand portions when the first and second lid portions are in the closed position;
a second coupling member interposed between the second and fourth stand portions when the first and second lid portions are in the closed position;
and wherein the first coupling member has a cut-out opening that mates and aligns with the first and third stand portions when the first and second lid portions are in the closed position;
and wherein the second coupling member has a cut-out opening that mates and aligns with the second and fourth stand portions when the first and second lid portions are in the closed position.

11. A portable feeding apparatus, comprising:
a collapsible bowl having an opening and a rim;
a lid comprised of a first lid portion and a second lid portion, wherein the first and second lid portions are symmetrical in shape and wherein the first and second lid portions each have a straight edge;
a first hinge for hingably connecting the first lid portion to the bowl;
a second hinge for hingably connecting the second lid portion to the bowl;
wherein the first and second lid portions are adapted to act as support stands for the bowl when in an open position;
a first stand portion attached at one end of the straight edge of the first lid portion;
a second stand portion attached at the opposite end of the straight edge of the first lid portion;
a third stand portion attached at one end of the straight edge of the second lid portion;
a fourth stand portion attached at the opposite end of the straight edge of the second lid portion;
and wherein the first and second stand portions act as a support base when the first lid portion is in the open position;
and wherein the third and fourth stand portions act as a support base when the second lid portion is in the open position;
wherein the first, second, third and fourth stand portions are tubular in shape with hollow openings;
wherein the openings of the stand portions on the first and second lid portions mate and align with each other when the lid portions are in a closed position; and
wherein the collapsible bowl is adapted to be expanded to hold food or water and collapsed to conserve space.

12. The portable feeding apparatus of claim 11, further comprising:
a first coupling member interposed between the first and third stand portions when the first and second lid portions are in the closed position;
a second coupling member interposed between the second and fourth stand portions when the first and second lid portions are in the closed position;
and wherein the first coupling member has a cut-out opening that mates and aligns with the first and third stand portions when the first and second lid portions are in the closed position;
and wherein the second coupling member has a cut-out opening that mates and aligns with the second and fourth stand portions when the first and second lid portions are in the closed position.

13. The portable feeding apparatus of claim 11, wherein the first lid portion is further comprised of a lock for fastening the first and second lid portions together in a closed position;
a raised portion in a semi-circle shape having an opening; and
wherein the lock is comprised of: a locking mechanism attached to the second lid portion, the locking mechanism in a semi-circle shape that fits within the opening formed by the raised portion, the locking mechanism having an end that is straight edge;
wherein the locking mechanism is adapted to rotate to lock the first and second lid portions in the closed position.

14. The portable feeding apparatus of claim 13, wherein the locking mechanism is adapted with a finger grip.

15. A portable feeding apparatus, comprising:
a bowl having an opening and a rim;
a lid comprised of a first lid portion and a second lid portion, wherein the first and second lid portions each have a straight edge;
a first hinge for hingably connecting the first lid portion to the bowl;
a second hinge for hingably connecting the second lid portion to the bowl;

a first stand portion attached at one end of the straight edge of the first lid portion;

a second stand portion attached at the opposite end of the straight edge of the first lid portion;

a third stand portion attached at one end of the straight edge of the second lid portion;

a fourth stand portion attached at the opposite end of the straight edge of the second lid portion;

wherein the first, second, third and fourth stand portions hang past the rim of the opening when the lid is in the closed position;

wherein the stand portions on the first lid portion aligns with the stand portions on the second lid portion when the lid portions are in the closed position;

wherein the first, second, third and fourth stand portions jut out away from the bowl when the lid is in the open position to form foot supports;

and wherein the first and second stand portions act as a support base when the first lid portion is in the open position;

and wherein the third and fourth stand portions act as a support base when the second lid portion is in the open position.

16. The portable feeding apparatus of claim 15, wherein the first, second, third and fourth stand portions are tubular in shape with hollow openings;

wherein the openings of the stand portions on the first and second lid portions mate and align with each other when the lid portions are in the closed position.

* * * * *